United States Patent [19]
Willis

[11] Patent Number: 5,256,982
[45] Date of Patent: Oct. 26, 1993

[54] RADIOGRAPHIC FILM RETAINING DEVICE

[76] Inventor: Timothy G. Willis, 310 Evergreen, Yreka, Calif. 96097

[21] Appl. No.: 862,817

[22] Filed: Apr. 3, 1992

[51] Int. Cl.$^5$ .............................................. G03B 42/02
[52] U.S. Cl. .................................... 378/168; 378/169; 378/170; 378/177
[58] Field of Search ................ 378/168, 169, 170, 177

[56] References Cited

U.S. PATENT DOCUMENTS

| | | | |
|---|---|---|---|
| 2,245,395 | 6/1941 | Goldberg . | |
| 2,782,317 | 2/1957 | Vacanti et al. | 378/168 |
| 2,899,559 | 12/1955 | Maurer . | |
| 3,936,643 | 2/1976 | Toner . | |
| 4,484,342 | 11/1984 | Allison et al. | 378/168 |
| 4,592,084 | 5/1986 | McAuslan | 378/168 |
| 4,593,401 | 6/1986 | Colbert | 378/168 |
| 4,598,416 | 7/1986 | Donato | 378/168 |
| 4,731,808 | 3/1988 | Ogunsunlade | 378/168 |
| 4,945,553 | 7/1990 | Willis | 378/168 |
| 5,090,047 | 2/1992 | Angotti et al. | 378/168 |

Primary Examiner—David P. Porta
Attorney, Agent, or Firm—Julian Caplan

[57] ABSTRACT

A radiographic film retaining device for holding a film packet while producing a radiographic image of selected teeth of a patient's mouth is disclosed. The retaining device includes a substantially thin bite portion configured for placement between upper and lower teeth of the patient's mouth and a retaining structure positioned distally of the bite portion. The retaining structure has a film packet gripping structure for holding the film packet lingually adjacent the selected teeth when the bite portion is gripped between the upper and lower teeth. The retaining structure comprises a narrow extension of the bite portion. The film packet gripping structure includes a slit formed and extending through the retaining structure from the distal end thereof toward the bite portion.

12 Claims, 1 Drawing Sheet

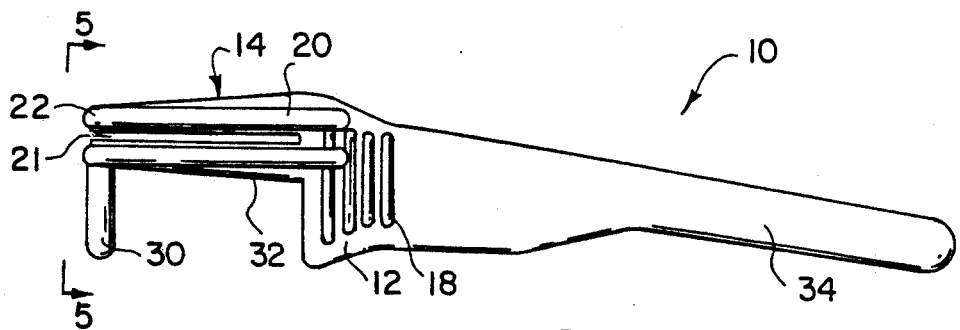
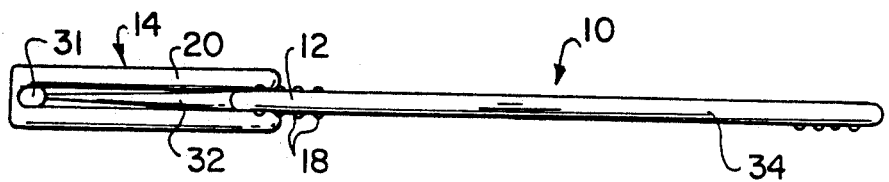
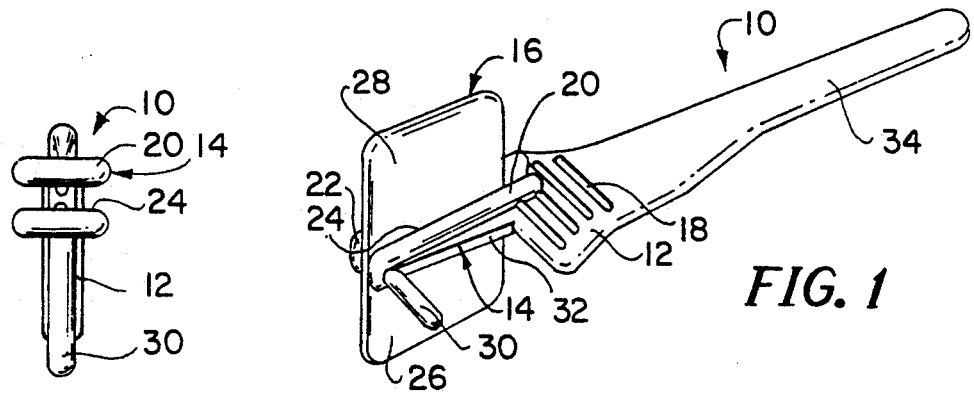
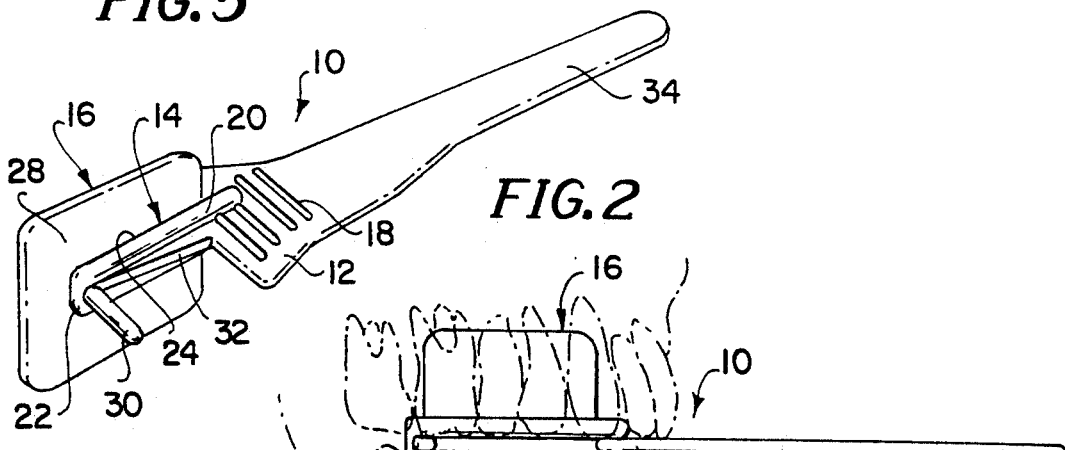
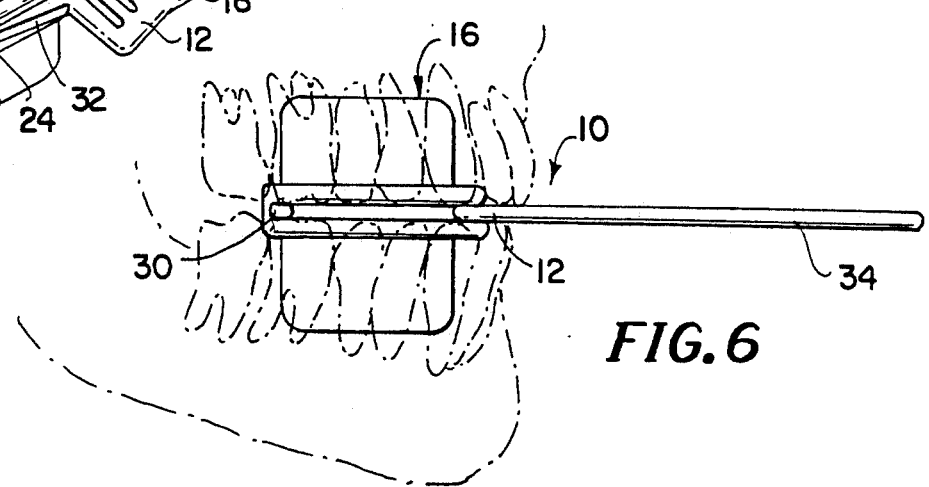

RADIOGRAPHIC FILM RETAINING DEVICE

BACKGROUND OF THE INVENTION

1. Field of the Invention

This invention relates in general to a radiographic film holder particularly useful in general dentistry. More particularly, the present invention relates to a retaining device for holding a film packet while producing a radiographic image of selected teeth of a patient's mouth.

2. Prior Art

Radiographic film holders suitable for general dentistry are well known in the art. The film holder traditionally includes a bite tab and is formed for receiving a piece of radiographic film. To properly position the holder within the patient's mouth, the upper and lower teeth grip the bite tab.

One type of film holder commonly used in the dental industry is a film packet having an integral bite tab. A piece of radiographic film is enclosed within the film packet, generally formed of cardboard. The tab is positioned at the midpoint of the film packet. To prepare an x-ray of selected teeth, the upper and lower edges of the film packet are slightly bent in a direction opposite the tab. A dental assistant inserts the holder into the mouth, and the patient bites down on the tab while a radiographic image is produced. After removal from the patient's mouth, the radiographic film is retrieved and the film packet is thrown away.

This type of film holder may conveniently be used while producing a radiographic image of selected teeth. When using bitewing film, a dental x-ray film designed to simultaneously photograph the crowns of the upper and lower teeth, the film must be held level within the patient's mouth to provide the dentist with a complete image of the patient's teeth. If a patient is missing teeth, or if the teeth are uneven or hypererupted, the patient will not bite down evenly on the tab, producing an incomplete image. In addition, the film holder may only be used once. This places a significant strain on environmental resources. A film retaining device which will hold a piece of radiographic film level relative to selected teeth of a patient's mouth is desirable. Similarly, a retaining device which may be repeatedly used would be particularly useful for preserving the environment.

Another variety of film holders available in the dental industry includes a bite tab having a depression or hole formed for receiving long or uneven teeth. The film holder may be used to produce complete images of the upper and lower teeth of a patient's mouth. However, in many instances the uneven or hypererupted teeth will not be completely accommodated within the depression or hole of the bite tab. The radiographic film will not be held level within the patient's mouth and the resulting image will be incomplete. A film retaining device which effectively holds the radiographic film level within the patient's mouth is desirable.

To provide a film holder which may be reused, a number of film holders include a groove formed to receive a packet of radiographic film. The patient grips a bite tab between his upper and lower teeth to position the holder within the mouth while producing an image of selected teeth. The location and orientation of the film retaining groove relative to the bite tab determines which of the patient's teeth will be photographed. A film holder having only one groove is not suitable for alternatively producing an image of the crowns of opposed teeth or an image of an entire tooth including the roots. The dentist must maintain a supply of several different film holders each suitable for producing one of several desired images. A film retaining device suitable for holding a piece of radiographic film in several different positions of orientation relative to the film holder is desirable.

Other film holders include more than one groove for holding the film packet in different positions. While providing increased versatility as to the orientation of the radiographic film relative to selected teeth, the film holder will not accommodate variations within a patient's mouth structure. If the patient has uneven or hypererupted teeth, the radiographic film may not be properly oriented adjacent the selected teeth. The resulting image would not depict the entire tooth structure needed. Additional radiographic images would have to be prepared, at the inconvenience of both the dentist and the patient. A film retaining device which will retain a film packet in a plurality of positions of orientation to adjust the position of the film packet relative to selected teeth of a patient's mouth is desirable.

Accordingly, a primary object of the present invention is to provide a radiographic film retaining device for holding a film packet while producing a radiographic image of selected teeth in a patient's mouth.

A further object of the present invention is to provide a radiographic film retaining device which holds a film packet level within the patient's mouth.

Another object of the present invention is to provide a radiographic film retaining device suitable for holding a film packet in a plurality of positions of orientation for adjusting the position of the film packet relative to selected teeth of the patient's mouth.

An additional object of the present invention is to provide a radiographic film retaining device suitable for holding a film packet having one of a plurality of different sizes.

Yet another object of the present invention is to provide a radiographic film retaining device which may be reused for holding a film packet while producing a radiographic image of selected teeth.

A more general object of the present invention is to provide a radiographic film retaining device which may be comfortably inserted into and held within the patient's mouth, which does not inflict pain while the radiographic image is produced, and which may be efficiently and inexpensively manufactured.

SUMMARY OF THE INVENTION

The radiographic film retaining device of the present invention is particularly suitable for holding a film packet while producing a radiographic image of selected teeth of a patient's mouth. The retaining device includes a substantially thin bite portion which is configured for placement between the upper and lower teeth of the patient's mouth. A retaining structure positioned distally of the bite portion includes a film packet gripping structure for retaining a portion of the film packet. When the patient bites down on the bite portion, gripping it between his upper and lower teeth, the retaining structure holds the film packet lingually adjacent the selected teeth.

The retaining structure comprises a narrow extension of the bite portion. The film packet gripping structure includes a slit formed in the retaining structure. The slit extends through the retaining structure from the distal end of the retaining structure towards the bite portion.

In the preferred embodiment, the film packet gripping structure is offset relative to the longitudinal axis of the bite portion. The film packet gripping structure and the bite portion define a recessed area shaped to receive the selected teeth. The slit is located and dimensioned to hold the film packet in a plurality of positions of orientation relative to the retaining structure. In another aspect of the present invention, the slit is formed to retain a film packet having one of a plurality of different sizes.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is an isometric view of a radiographic film retaining device constructed in accordance with the present invention, shown holding a film packet in a first position.

FIG. 2 is an isometric view of the radiographic film retaining device of FIG. 1, shown holding a film packet in a second position.

FIG. 3 is a top plan view of the radiographic film retaining device of FIG. 1.

FIG. 4 is a side elevational view of the radiographic film retaining device of FIG. 1.

FIG. 5 is an end elevational view of the radiographic film retaining device taken along line 5—5 of FIG. 3.

FIG. 6 is a schematic side elevational view of the radiographic film retaining device of FIG. 1 shown holding a film packet in the first position, shown in position of use in a patient's mouth.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The preferred embodiment of a radiographic film retaining device constructed in accordance with the present invention is illustrated in FIGS. 1-6. Radiographic film retaining device 10 includes a substantially thin bite portion 12 and a retaining structure 14 positioned distally of the bite portion for holding a film packet 16. The bite portion is configured for placement between the upper and lower teeth. A number of ridges 18 protrude from the surface of the bite portion, improving the grip of the patient's teeth on the retaining device.

When producing an x-ray or radiographic image of selected teeth of the patient's mouth, the patient grips the bite portion between his upper and lower teeth. The retaining structure holds the film packet lingually adjacent selected teeth while a radiographic image is produced. Retaining structure 14, positioned distally of bite portion 12, comprises a narrow extension of the bite portion. The retaining structure includes a film packet gripping structure or gripping members 20 extending through the retaining structure from distal end 22 toward the bite portion for holding the film packet. In the preferred embodiment, gripping structure 20 includes a substantially narrow slit 24 for retaining the film packet. The slit extends through the retaining structure from the distal end to bite portion 12.

Film packet 16 is retained within slit 24 in a plane substantially transverse to the bite portion. When the patient grips the bite portion between his upper and lower teeth, the film packet is held lingually adjacent selected teeth. The slit is located and dimensioned to hold the film packet in one of several positions of orientation. Turning specifically to FIG. 1, the film packet is held in a first position suitable for photographing a substantial portion of opposed upper and lower teeth. In FIG. 2, the film packet is retained in a second position for producing an image of the crowns of several upper and lower teeth. The two orientations of film packet 16 are shown by way of example. The film packet may be held in several alternative positions of orientation. For example, instead of gripping the middle of the film packet, the gripping structure may engage lower edge 26 while producing an image of an upper tooth. Thus, the retaining device will accommodate any dental condition, including missing teeth and gum disease. Similarly, slit 24 is suitable for holding a film packet having one of several different sizes. For example, the retaining device of the present invention may be used in the mouth of a child or an adult.

One type of film packet used in the dental industry consists of a substantially rectangular piece of radiographic film (not shown) enclosed within a polymeric protective envelope 28. The film packet is flexible, and will yield to conform to the contour of the patient's mouth. The film packet is available in several sizes appropriate for different mouth capacities and dental conditions.

In the preferred form of the present invention, a substantially thin second bite portion 30 projects from the retaining structure transverse to gripping structure 20. In the preferred form shown in the drawings, second bite portion 30 is rectangular in cross-section, having flat top and bottom surfaces readily gripped between the patient's teeth. The second bite portion ensures that the film packet is maintained in a level orientation relative to the teeth. When the retaining device is inserted within the patient's mouth, bite portion 30 rests against the back teeth. Bite portion 12 is gripped between upper and lower teeth which are located toward the front of the mouth to hold the retaining device in position. When a patient is missing one of the molars, the film packet is properly aligned as the patient grips bite portion 12. If the patient suffers from a dental condition preventing the upper and lower teeth from properly gripping bite portion 12, the second bite portion 30 will balance the retaining device within the patient's mouth.

When preparing a bitewing image, a depiction of the crowns of the upper and lower teeth, the radiographic film must be held level within the patient's mouth. To properly position the film packet adjacent selected teeth, gripping structure 20 is offset relative to the longitudinal axis of the bite portion. Film retaining device 10 of the present invention includes a recess or recessed area 32 shaped to receive the selected teeth. The recess is defined by bite portion 30, gripping structure 20 and bite portion 12. When the retaining device is inserted into the patient's mouth, the upper and lower teeth grip bite portion 12 while the selected teeth are substantially received within recessed area 32.

The selected teeth do not contact the bite portion, but are instead disposed within the recessed area. With the recessed area of the present invention, the interengagement between the upper and lower selected teeth will be depicted in the radiographic image. Uneven or hypererupted teeth will not distort the positioning of the film since the selected teeth do not contact the bite portion. Thus, the retaining device is properly positioned within the mouth with the radiographic film properly aligned relative to the selected teeth.

Handle portion 34 is integrally formed with bite portion 12 to facilitate the manipulation of the retaining device into and out of the patient's mouth. When preparing to produce a radiographic image of selected teeth, the dentist will grasp the handle portion and carefully position the retaining structure within the patient's mouth. The dentist's fingers will not enter the patient's mouth, vastly improving the patient's comfort. The substantially thin handle portion will not obstruct the dentist's view of the patient's mouth, allowing retaining structure 14 to be more precisely positioned adjacent the selected teeth.

The retaining device of the present invention is preferably formed of a polymeric material, such as nylon. The polymeric material provides a retaining device which may be repeatedly sterilized and reused. However, other materials may be substituted. Since the gripping structure is shaped to retain the film packet in several different positions of orientation, a single film retaining device may be used for numerous applications. Thus, the dentist need not maintain a supply of several different types of film holding devices. The film packet may be easily placed within the gripping structure slit and adjusted to a desired location, improving the efficiency of producing radiographic images and reducing patient discomfort.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A radiographic film retaining device for holding a film packet while producing a radiographic image of selected teeth of a patient's mouth, said film packet comprising a substantially rectangular piece of radiographic film enclosed within a protective polymeric envelope, said retaining device comprising:
   (a) a bite portion configured for placement between upper and lower teeth of the patient's mouth, said bite portion having a thickness such that when said bite portion is gripped between said upper and lower teeth, the patient's mouth is in a substantially closed position; and
   (b) retaining means positioned distally of said bite portion having film packet gripping means for retaining a portion of said film packet such that when said bite portion is gripped between said upper and lower teeth, said retaining means holds said film packet lingually adjacent said selected teeth, said retaining means comprising an extension of a portion of said bite portion, said film packet gripping means comprising a slit formed in said retaining means, said slit extending through the distal end of said retaining means and toward said bite portion, said slit having a terminus at a marginal edge of said retaining means, said terminus being formed to receive said film packet for insertion of said film packet into said slit through said terminus, said slit being formed to selectively retain said film packet in said slit with a portion of said film packet extending through said terminus and projecting from said slit.

2. The retaining device of claim 1 wherein said film packet gripping means is offset relative to the longitudinal axis of said bite portion, said film packet gripping means and said bite portion defining a recessed area shaped to receive said selected teeth.

3. The retaining device of claim 1 wherein said slit is located and dimensioned to retain said film packet in a plurality of positions of orientation relative to said retaining means whereby said packet may be adjusted in position relative to said selected teeth.

4. The retaining device of claim 1 wherein said slit is shaped and positioned to hold said film packet in a plane substantially transverse to said bite portion.

5. The retaining device of claim 1 wherein said slit is adapted to retain said film packet having one of a plurality of selected sizes.

6. The retaining device of claim 1 further comprising a second bite portion projecting from said retaining means transverse to said film packet gripping means, said second bite portion configured for placement between said upper and lower teeth and having a thickness such that when said second bite portion is gripped between said upper and lower teeth, the patient's mouth is in a substantially closed position, said second bite portion, said retaining means, and the first-mentioned bite portion defining a recess shaped to receive said selected teeth.

7. The retaining device of claim 1 further comprising a handle portion integrally formed with said bite portion for facilitating the manipulation of said retaining means into and out of said mouth.

8. The retaining device of claim 1 further comprising a film packet positioned transverse to said bite portion within said slit, said film packet comprising a substantially rectangular piece of radiographic film enclosed within a protective polymeric envelope, said film packet being flexible about said film packet gripping means to conform to the contour of the patient's mouth.

9. The retaining device of claim 1 wherein said bite portion is formed having a plurality of ridges.

10. The retaining device of claim 1 wherein said bite portion and said retaining means are formed of a polymeric material which may be repeatedly sterilized.

11. A radiographic film retaining device for holding a film packet while producing a radiographic image of selected teeth of a patient's mouth, said film packet comprising a substantially rectangular piece of radiographic film enclosed within a polymeric envelope, said retaining device comprising:
   (a) means for retaining a portion of said film packet lingually adjacent said selected teeth, said retaining means having a distal end and a proximal end, said retaining means comprising first and second film gripping members defining a slit formed in said retaining means, said slit extending through said distal end toward said proximal end;

(b) a first bite portion formed at said proximal end and configured for placement between opposed upper and lower teeth of the patient's mouth, said first bite portion projecting from said retaining means in a bite plane transverse to said first and second gripping members whereby said retaining means is offset relative to the longitudinal axis of said first bite portion, said first bite portion being having a thickness such that when said first bite portion is gripped between said opposed upper and lower teeth, the patient's mouth is in a substantially closed position;

(c) a second bite portion formed adjacent said distal end of said retaining means, said second bite portion projecting from said retaining means in said bite plane;

(d) said slit being shaped and positioned for retaining said film packet in a film plane substantially perpendicular to said bite plane; and (e) said first bite portion, said retaining means and said second bite portion defining a tooth receiving area shaped to receive at least one of said selected teeth.

12. A radiographic film retaining device for holding a film packet while producing a radiographic image of selected teeth of a patient's mouth, said film packet comprising a substantially rectangular piece of radiographic film enclosed within a protective polymeric envelope, said retaining device comprising:

(a) a substantially U-shaped bite portion configured for placement between upper and lower teeth of the patient's mouth, said U-shaped bite portion defining a tooth receiving area shaped to receive at least one of said selected teeth, said U-shaped bite portion having a thickness such that when said U-shaped bite portion is gripped between said upper and lower teeth, the patient's mouth is in a substantially closed position; and (b) means for retaining a portion of said film packet lingually adjacent said selected teeth, said retaining means comprising a portion of said U-shaped bite portion, said retaining means having film packet gripping means comprising a slit formed in said retaining means, said slit extending through the distal end of said retaining means toward said bite portion, said slit having a terminus at a marginal edge of said retaining means, said terminus being formed to receive said film packet for insertion of said film packet into said slit through said terminus, said slit being formed to selectively retain said film packet in said slit with a portion of said film packet extending through said terminus and projecting from said slit.

* * * * *